US012618489B2

(12) United States Patent
Johansson

(10) Patent No.: US 12,618,489 B2
(45) Date of Patent: May 5, 2026

(54) ELECTROMECHANICAL VALVE AND A SORTING MANIFOLD COMPRISING A PLURALITY OF STACKED SUCH VALVES

(71) Applicant: STACCATO TECHNOLOGIES AB, Haninge (SE)

(72) Inventor: Per-Ove Johansson, Trångsund (SE)

(73) Assignee: STACCATO TECHNOLOGIES AB, Haninge (SE)

( * ) Notice: Subject to any disclaimer, the term of this patent is extended or adjusted under 35 U.S.C. 154(b) by 24 days.

(21) Appl. No.: 18/865,399

(22) PCT Filed: May 25, 2023

(86) PCT No.: PCT/SE2023/050512
§ 371 (c)(1),
(2) Date: Nov. 13, 2024

(87) PCT Pub. No.: WO2023/239275
PCT Pub. Date: Dec. 14, 2023

(65) Prior Publication Data
US 2025/0314325 A1      Oct. 9, 2025

(30) Foreign Application Priority Data
Jun. 9, 2022    (SE) .................................... 2250691-9

(51) Int. Cl.
*F16K 31/06*          (2006.01)

(52) U.S. Cl.
CPC ...... *F16K 31/0675* (2013.01); *F16K 31/0644* (2013.01)

(58) Field of Classification Search
CPC .. F16K 31/0675; F16K 31/0644; F16K 15/16; B07B 13/00
See application file for complete search history.

(56) References Cited

U.S. PATENT DOCUMENTS 2,087,835 A * 7/1937 Buehler, Jr. ............ F28F 9/013
165/135
4,089,348 A * 5/1978 Yoshida .............. F16K 15/1825
137/856

(Continued)

FOREIGN PATENT DOCUMENTS

DE      102008050907 A1     4/2010
WO        2015126304 A1     8/2015

OTHER PUBLICATIONS

International Search Report for PCT/SE2023/050512 dated Jun. 28, 2023, 6 pages.

(Continued)

*Primary Examiner* — Patrick C Williams
(74) *Attorney, Agent, or Firm* — NIXON & VANDERHYE P.C.

(57) ABSTRACT

An electromechanical valve (10), comprising in a housing (20), a valve mechanism. The valve mechanism comprises a core (34) of magnetizable material surrounded by a coil (32) to be supplied with excitation current, a stack (36) of plates of magnetic material secured in a first end thereof, and a valve seat (38). The stack (36) of plates is provided in a space between the core (34) and the valve seat (38) to open/close the valve in response to an excitation current supplied to said coil (32) by displacing the stack (36) of plates from the valve seat when excitation current is supplied to the coil (32), the stack of plates providing a return spring force when the stack of plates is attracted to by an energized coil, wherein the core (30) is plate shaped and less than 3 mm thick.

12 Claims, 7 Drawing Sheets

(56)                    References Cited

U.S. PATENT DOCUMENTS

| | | | | |
|---|---|---|---|---|
| 4,502,031 | A | 2/1985 | Ito et al. | |
| 5,628,411 | A | 5/1997 | Mills et al. | |
| 5,887,622 | A * | 3/1999 | Ahn ..................... | F16K 15/162 |
| | | | | 137/856 |
| 7,624,964 | B2 * | 12/2009 | Powell .................. | F16K 31/006 |
| | | | | 251/333 |
| 2004/0065858 | A1 | 4/2004 | Schroeder | |
| 2004/0222397 | A1 | 11/2004 | Hayashi | |
| 2010/0038572 | A1 | 2/2010 | Alvarez et al. | |
| 2012/0152810 | A1 | 6/2012 | Wirtl et al. | |
| 2013/0019840 | A1 * | 1/2013 | Kawada .......... | F02M 35/10275 |
| | | | | 123/90.11 |
| 2014/0197341 | A1 | 7/2014 | Yoshimura et al. | |
| 2014/0299802 | A1 | 10/2014 | Brust et al. | |
| 2020/0025294 | A1 * | 1/2020 | Kimura ................ | F16K 1/2007 |
| 2021/0310572 | A1 * | 10/2021 | Karino ................... | F16K 15/16 |

OTHER PUBLICATIONS

Written Opinion of the ISA for PCT/SE2023/050512 dated Jun. 28, 2023, 6 pages.

* cited by examiner

C

35

36

36

39

39a

42

41

50

10

10

50

50

60

ELECTROMECHANICAL VALVE AND A SORTING MANIFOLD COMPRISING A PLURALITY OF STACKED SUCH VALVES

CROSS-REFERENCE TO RELATED APPLICATIONS

This application is the U.S. national phase of International Application No. PCT/SE2023/050512 filed May 25, 2023 which designated the U.S. and claims priority to SE Patent Application No. 2250691-9 filed Jun. 9, 2022, the entire contents of each of which are hereby incorporated by reference.

TECHNICAL FIELD

The disclosure relates generally to valves and more specifically to an electromechanical valve. The disclosure also relates to arrangements including such valves.

BACKGROUND

In some applications, it is desired to pack pneumatic valves with high density. One such application is the sorting of goods with air bursts. Sorting with air bursts is common in, but not limited to, the of applications of sorting grains, seeds, and other fairly light items in quality and/or properties sorting. This is commonly done with foodstuffs, items for recycling, and manufacturing as well as for mineral concentration.

The sorting is done by identifying which items that are to be placed in a different path and then separating them from the main flow(s). Feeding can be done with hoppers, belts, special cavity drums and other means.

In for example US2012152810, a sorting device for sorting out parts by means of air blasts is described. The sorting device comprises an air blast generator having a generator housing in which at least one reversibly deflectable diaphragm unit bounds a working chamber connected to an ejection opening. The discharge of an air blast from the working chamber through the ejection opening can be caused by the activation of the diaphragm unit.

There is a constant desire to improve the performance and robustness of valves to be used in various applications such as in sorting devices. Hence there exists a need for an improved valve and in particular a valve suitable for sorting applications.

SUMMARY

An object of the invention is to overcome or at least partly reduce the disadvantages with prior valves and to provide an improved valve that can be used for e.g., sorting application and be used as a sorting device.

Another object is to provide a compact valve that can be used in applications where valves are stacked such that a plurality of valves can be packaged to form an assembly. Hereby a plurality of valves can be placed next to one another and detachably joined to one another. To obtain an efficient assembly of stacked valves the valve preferably has a flat design as seen in the stacking direction.

These objects and/or other are, at least partly, attained by the electromechanical valve according to the present invention as set out in the appended claims.

In accordance with the invention an electromechanical valve is provided. The valve comprises in a housing a valve mechanism. The valve mechanism comprises a core of magnetizable material surrounded by a coil to be supplied with excitation current and a stack of plates of magnetizable material secured in a first end thereof. The valve mechanism further comprises a valve seat. The stack of plates is provided in a space between the core and the valve seat to open/close the valve in response to an excitation current supplied to said coil by displacing the stack of plates from the valve seat when excitation current is supplied to said coil. The stack of plates provides a return spring force when the stack of plates is attracted to by an energized coil and where the core is plate shaped having a thickness of less than 3 mm. Hereby the valve can be made very thin which is desired in many applications such as sorting applications.

In accordance with one embodiment, the core has an attraction section facing the stack of plates with no coil wound around the attraction section. Hereby the valve can be made thinner without reducing the performance of the valve. The attraction section can form a projection from the flat core. In accordance with some embodiments the projection is a lip off-set from the plane of the core. Hereby an even thinner valve can be provided.

In accordance with some embodiments the flat core has a rectangular cross-section. The core can be less than 1 mm thick.

In accordance with one embodiment, the valve seat has a slit shaped seat opening. Hereby the performance of the valve can be improved and more air can pass through the valve in a short time. The slits shaped seat opening can have a wider mid-section. Hereby opening time can be reduced in that air pressure is more easily equalized.

In accordance with some embodiments, a plurality of outlets is provided in the housing. Also at least two valve assemblies are provided in the housing where each of said at least two valve assemblies are associated with a respective outlet. Hereby the dimensions of the housing can be reduced and the air outlets can be spaced close together since no walls need to be provided between two adjacent air outlets.

In accordance with one embodiment, the core is U-shaped with two legs. Hereby a space efficient implementation of the core is obtained. In accordance with some embodiments the coil is only wound around one of the legs of the U-shaped core or a section of one of the legs of the U-shaped core. Hereby space can be saved.

The invention also extends to a manifold comprising a plurality of stacked valves in accordance with the above. Hereby an assembly that can be used in sorting applications can be provided that has a very short distance between successive air outlets so that air blasts van be provided with a narrow pitch.

BRIEF DESCRIPTION OF THE DRAWINGS

The invention will now be described in more detail by means of non-limiting examples and with reference to the accompanying drawings, in which.

DETAILED DESCRIPTION

Aspects of the present invention will now be described more fully. Like numbers refer to like elements throughout. Well-known functions or constructions will not necessarily be described in detail for ease of understanding and/or clarity. It is further to be understood that the features described can be combined in any suitable manner to meet different implementational needs. Some elements can be omitted in some embodiments. Further, while the exemplary embodiments described herein are illustrated by a generally rectangular housing other designs can be used.

Figure 1:
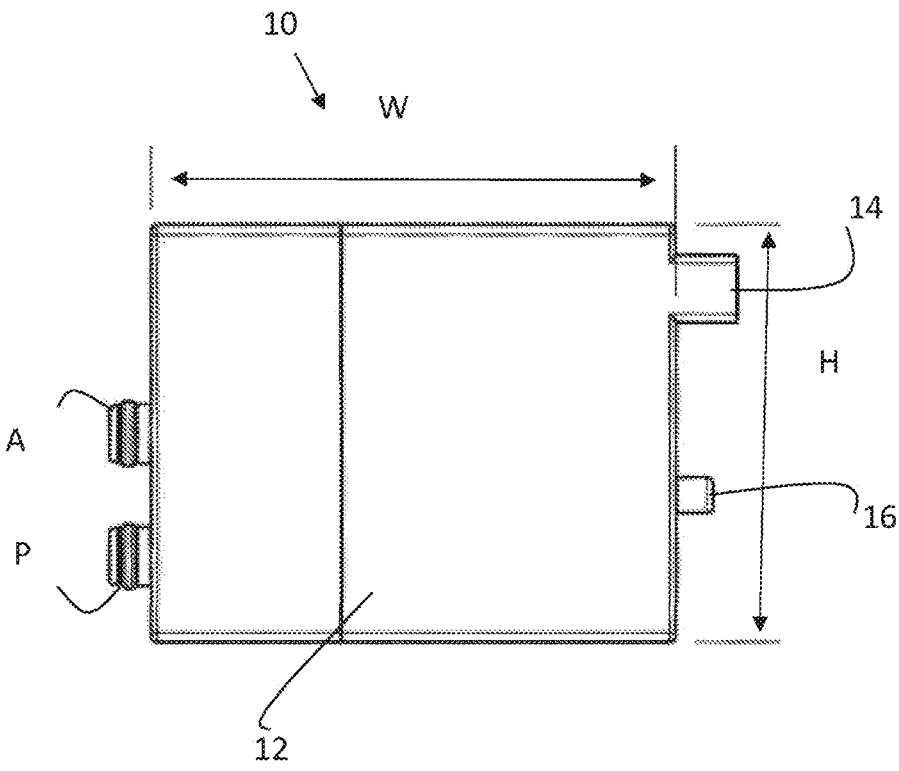
FIG. 1 is a side view of an electromechanical valve that can be used as a sorting device.

In FIG. 1, a view from the side of an embodiment of an electromechanical valve 10 is shown. The valve can typically be designed to be a pneumatic valve. However, other fluids than air can also be envisaged. In the below exemplary embodiments, it is assumed that air is used as a pressurized fluid. The valve 10 is provided in a housing 12. In the following description the housing 12 is designed to have one inlet of pressurized air and one air outlet. However, it is also envisaged that multiple outlets can be provided in one single housing. In embodiments with multiple outlets each outlet can be controlled by a valve mechanism comprising a controllable electromagnet. In such embodiments the outlets can be stacked closer together.

In FIG. 1, the housing 12 has an air inlet P where pressurized air is supplied. The housing 12 further has an air outlet A. In the embodiment of FIG. 1 the air inlet P and the air outlet A are located on the same surface. However, it is envisaged that other locations of the inlet P and outlet A can exist. The housing 12 can be provided with an electrical connector 14 for supplying electric power to the electromechanical valve. Further, a positioning plug 16 can be provided on the housing 12. The positioning plug can be formed as a projection formed in the housing 12. The plug 16 can be used to position the valve 10 in some kind of arrangement or device.

The housing 12 can have a generally rectangular shape as seen from the side. The dimensions can be small with a width W of less than 100 mm and typically less than 50 mm. Similarly, the Height H can be less than 100 mm and typically less than 50 mm. The housing 12 can be made of non-magnetic/non-magnetizable material, e.g., aluminium or a plastics material.

It is to be understood that the location of the inlet P is not restricted but that the location of the inlet P can depend on the intended use of valve 10 and can hence be located at any suitable location depending on the field of use of the valve 10. Similarly, the outlet A can hence be located at any suitable location depending on the field of use of the valve 10.

Figure 2:
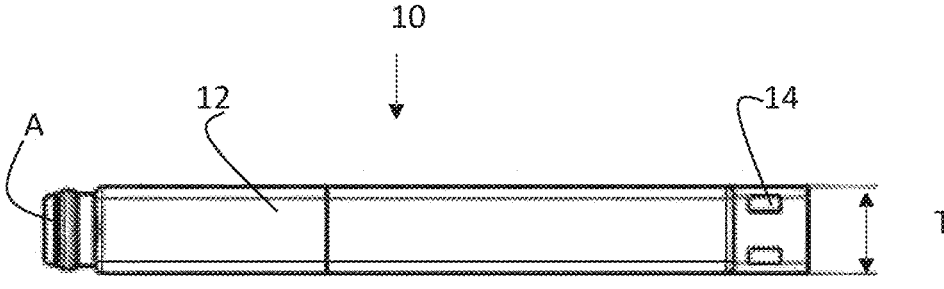
FIG. 2 is a top view of the electromechanical valve.

In FIG. 2, a top view of the valve 10 is shown. As can be seen the valve 10 can be made very flat. The thickness T of the valve 10 can be only a few mm such as less than 10 mm or about 5-6 mm or even less such as 4 mm or less. In particular the thickness T can be only a fraction of the height H and or width W of the valve. For example, the thickness T can be less than $\frac{1}{5}$ of the height H and or width W of the valve or even less than $\frac{1}{10}$ of the height H and or width W of the valve 10. The surfaces having such dimensions can be termed the narrow surfaces.

In accordance with some embodiments some or all of the inlet P, outlet A and electrical connector 14 can be provided on a side that is narrow in relation to the other sides. In the embodiments shown herein the inlet P and the outlet A are provided on a common, narrow, surface. In accordance with some embodiments the electrical connector 14 can be provided on a narrow surface opposite to the narrow surface where the inlet P and or outlet A are provided.

Figure 3:
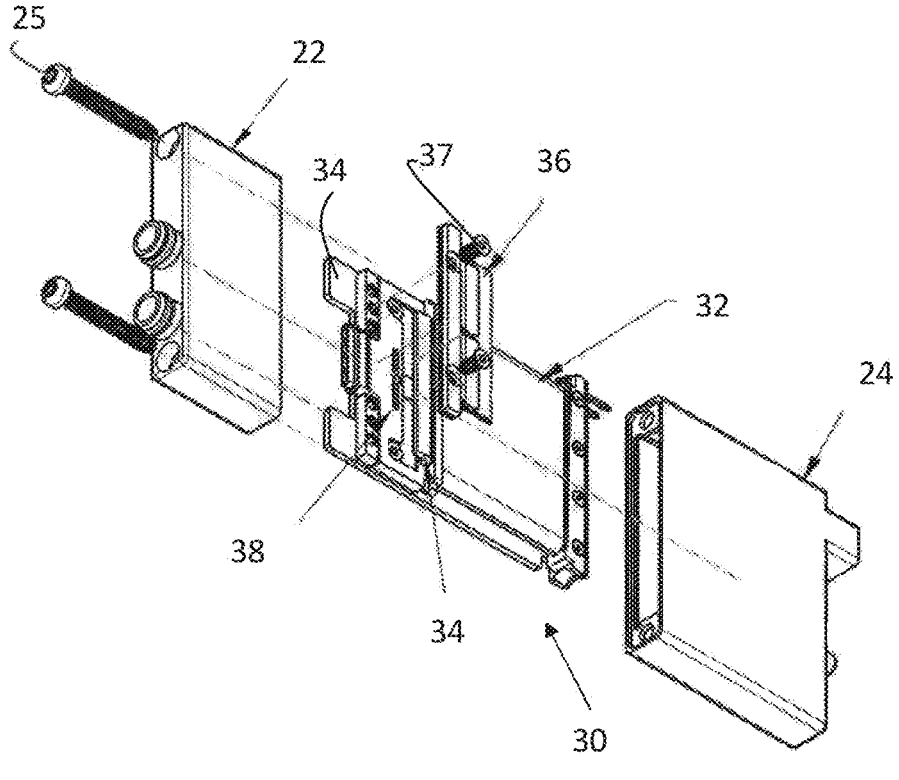
FIG. 3 is an exploded view of the electromechanical valve.

In FIG. 3, an exploded view of the valve 10 is shown. The valve 10 comprises, mounted on the housing 12, an air inlet P, an air outlet A, and an electrical connector 14. In this exemplary embodiment the housing 12 is formed by a first cover 22 facing the pneumatic side where the air inlet P and air outlet A are located. The housing 12 is further formed by a second cover 24 where the electrical connector is located. When the housing 12 is formed by a plurality of parts such as in this exemplary embodiment, the different parts of the housing 12, here the first cover 22 and the second cover 24 can be joined together. The different parts of the housing can be joined by some fastening means such as screws 25 or some other means such as a snap fit.

Inside the housing 12, a valve mechanism is provided. The valve mechanism comprises an electromagnet, a stack of plates and a valve seat. Thus, an electromagnet 30 is located inside the housing 12. The electromagnet 30 is here formed by a coil 32 wound around a core 34 comprising a magnetizable material such as iron or cobalt; or a soft magnetic material. The core 34 can also comprise an alloy that can be magnetized such as FeCo. The electromagnet 30 is cooperating with a stack 36 of multiple layers of a magnetizable material forming a blade spring. The stack 36 can be formed by laminated thin plates comprising magnetizable material such as iron or cobalt or similar. The stack 36 is located on a valve seat 38.

The stack 36 can be fastened using some suitable means 37 such as screws or rivets. The valve seat can be provided with a sealing or in accordance with some embodiments be formed by a material having sealing properties such as plastics material or a reinforced plastics material.

By activating the electromagnet 30, the stack 36 of is moved between a first position closing the valve and a second position with the valve open using a mechanism such as described in e.g., WO2015126304. Thus, when excitation current is supplied to the coil 32 surrounding the core 34 to magnetize the core 34, the stack 36 cooperates with, i.e., is attracted by, the magnetized core 34 to open the outlet A. When no excitation current is supplied, the stack 36 returns to an initial position by its inherent spring force. In this embodiment the initial position is a position where the stack 36 rests against the valve seat 38 so as to form a valve that is normally closed. In other words, the valve is opened when an excitation current is applied so as to activate the valve. In an alternative embodiment the valve can be designed to be normally closed so that the valve is open when no excitation current is provided.

Thus, in the embodiment of FIG. 3, the valve seat 38 connects the pressurized inside of the housing with the air outlet A. By activating the electromagnet, formed by the core 34 having a coil 32 wound around it, pressurized air inside the housing is let out via the valve seat 38 to the air outlet A when the stack 36 is lifted from its initial position by the magnetic force provided when the electromagnet is activated. When multiple air outlets A are provided in the same housing 12, each air outlet A can be individually controlled by a separate assembly of electromagnet 30, stack 36 of plates and valve seat 38. Hence, each air outlet A can then be individually connected to such an assembly and thereby individually controlled. Hereby the housing can be made simpler and the outlets can be placed closer together in that the housing walls can be removed when multiple air outlets are provided. Hereby a more compact design can be achieved when multiple individually controlled air outlets A are provided.

Figure 4:
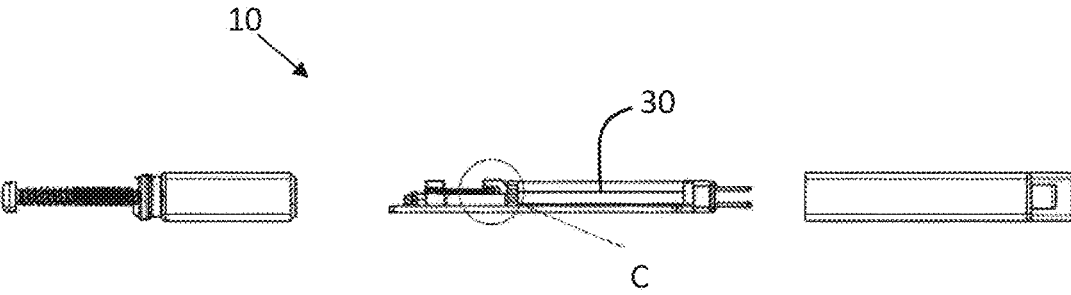
FIG. 4 is a top view of a disassembled electromechanical valve.

In FIG. 4, a top view of the valve 10 in a disassembled state is shown. In order to provide a very thin pneumatic valve having a thickness of only a few mm such as less than 3 mm, the electromagnet 30 can have core 34 that has a flat design, and can be formed only 0.2-3 mm thick formed plate shaped as a strip. Typically, the core can be thinner than 1 mm. However, the strip forming the core 34 can be wide and have a width of at least 10 mm or more such as 30-50 mm. In particular the width is much larger than the thickness whereby a thin core can be provided that can provide a large magnetic flow. For example, the width can be at least 5 or 10 times the thickness of the plate shaped core.

Figure 5A:
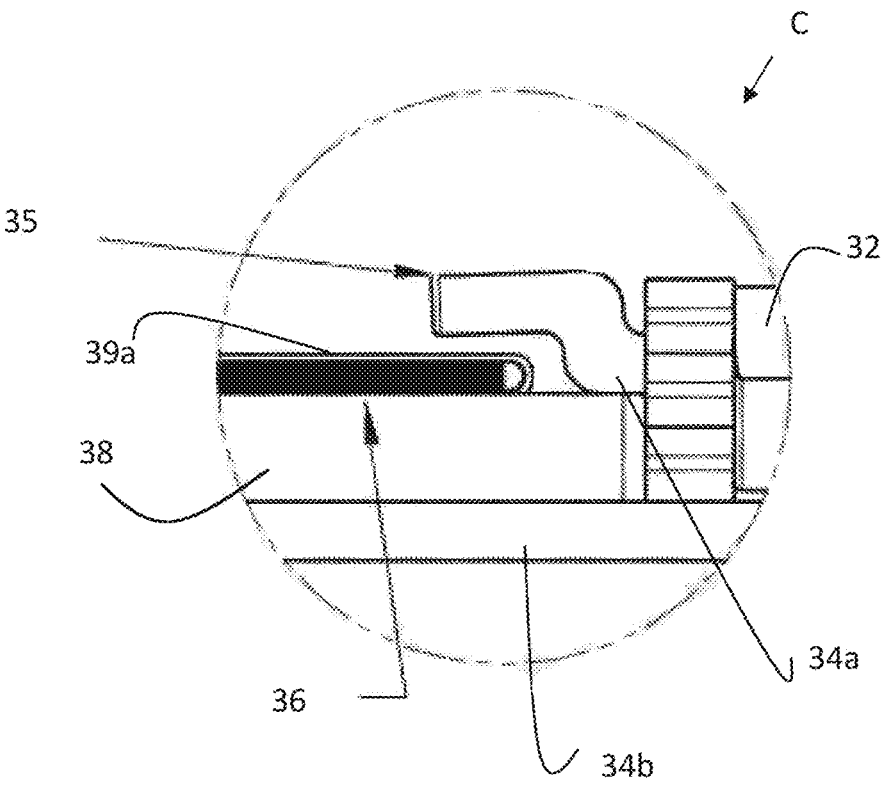
FIG. 5a illustrates a detail of FIG. 4 when the electromechanical valve is not provided with an excitation current.

FIG. 5a shows the detail C of FIG. 4. In order to provide a very thin pneumatic valve having a thickness of only a few mm, the electromagnet can have core 34 that has a flat design, and can be formed only 0.2-3 mm thick. The core 34 can typically have a generally rectangular cross section and is thin so as to form a plate like structure. Around at least a section of the flat plate shaped core, the coil 32 is wound.

Also, as can be seen in FIG. 5a, the flat core 34 can be formed with a projection formed by a lip 35 in an end facing the stack 36. The lip 35 can be offset from the plane of the flat plate shaped core by a curved section. The curved section can for example be S-shaped. Hereby the stack 36 can be located under the lip 35 such that the dimensions of the valve 10 can be further reduced. Thus, in such an embodiment the coil is not wound around the core where the lip 35 is formed. The projection forms an attraction section of the core 34. In other words, the projection is the part of the core 34 with which the stack 36 cooperates to open/close the valve. In an alternative embodiment the projection from the flat core 34 can be formed as an extension from the flat plate shaped core 34. The projection can then be formed thinner than the rest of the core and located at the top as seen in FIG. 5a. In other words, at a maximum distance from the valve seat so as to increase the space between the valve seat 38 and the attraction section of the core 34. In FIG. 5a the valve is not activated and no excitation current is applied to the coil. The stack 36 then rests against the valve seat 38.

In accordance with some embodiments the core 34 is generally U-shaped. The embodiment of FIG. 5a shows such a U-shaped core 34. The core 34 has two legs. One upper leg 34a with the coil 32 wound around it and a lower leg 34b as seen in FIG. 5a. By only providing a coil 32 on one of the legs 34a, 34b space can be saved and the valve 10 made thinner. The lower leg 34b can have the stack 36 and the valve seat 38 secured thereto. The two legs 34a, 34 b can be connected in a suitable matter by a magnetizable material such as a material comprising iron. In accordance with some embodiments, the U-shaped core is formed as one integral element.

When the core 34 is U-shaped, the stack 36 and the valve seat 38 can be located between the end sections of the legs 34a, 34 b. Hereby the magnetic flow in the U-shaped core can be closed via the stack 36 when excitation current is applied to the coil 32 and the core is magnetized. FIG. 5a illustrates such an embodiment.

Figure 5B:
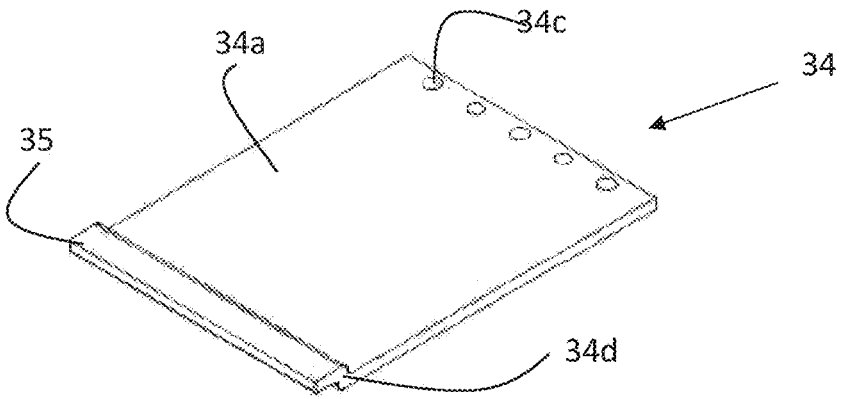
FIG. 5b shows a detail of the core in the electromechanical valve.

In FIG. 5b a part of a core 34 is shown. In FIG. 5b only the upper leg 34 a is shown and connecting elements 34c are provided at the back section of the upper leg 34a to connect to the lower leg. As is seen in FIG. 5b, the lip 35 is offset from the main plane of the upper leg 34 via a bent section 34d on the core 34.

Figure 6:
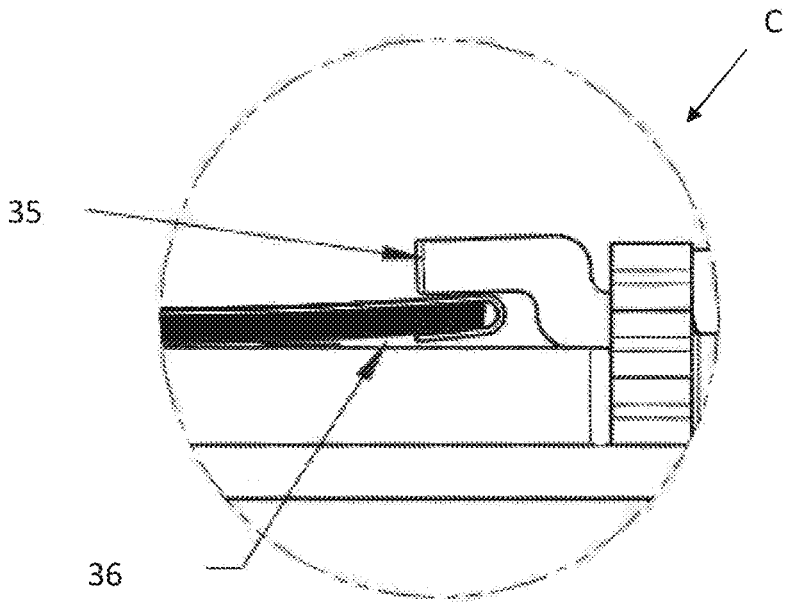
FIG. 6 is a view similar to FIG. 5a with an excitation current provided to the electromechanical valve.

In FIG. 6 a view similar to the view of FIG. 5 is shown. Here an excitation current is applied such that the electromagnet is activated. The stack 36 comprising a magnetic material is then attracted by the core 34 of the electromagnet so as to be displaced from its normal resting position shown in FIG. 5a. The valve in this exemplary embodiment is then opened and air is output via the outlet A. At the same time, since the coil can be located close to the air path through the valve 10 air cooling of the coil can be achieved by air flowing through the valve 10.

Figure 7:
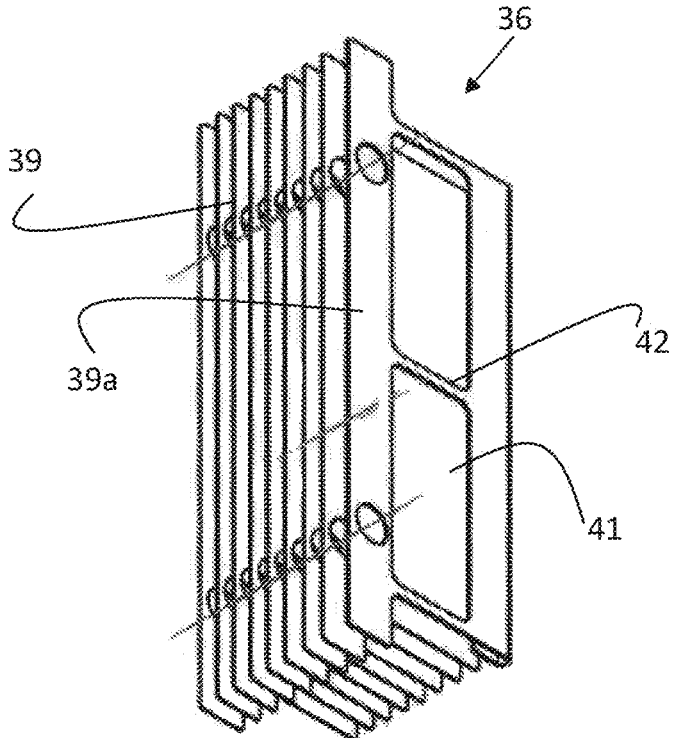
FIG. 7 illustrates a stack of plates.

In FIG. 7, a detailed view of the plates 39 of the stack 36 is shown. The plates 39 can have a generally rectangular design. The section facing away from the core can be provided with fastening holes for securing the stack to the valve housing or the core 34. The top plate 39a facing the core and which is lifted by the core can be different from the other plates 39. This top plate 39a can be shaped to hold the other plates together. Also, the top plate 39a can be made of another material and in particular a non-magnetizable material. The top plate 39a can also be provided with cut-outs 41 for adjusting the spring force of the stack 36. The cut-outs 41 can be divided by a bridge section 42. Further the thickness of the top plate 39a can be different from the other plates 39 of the stack 36.

Figure 8:
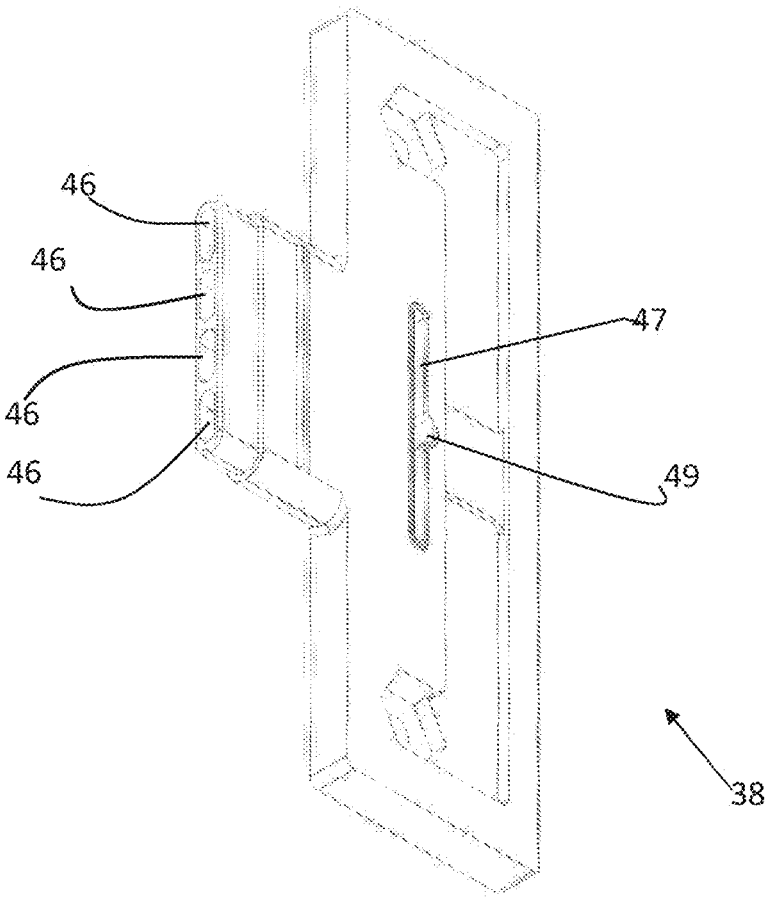
FIG. 8 illustrates a valve seat.

In FIG. 8 the valve seat 38 is shown. The valve seat can have at least one outlet channel 46 operatively connected to the air outlet A. In the embodiment of FIG. 8, a plurality of outlet channels is formed in the valve seat 38 in that it has four outlet channels 46. The valve seat 38 has a seat opening 47 adapted to cooperate with the stack 36. The seat opening 47 forms the inlet channel to the valve. Thus, when the stack 36 rests against the seat opening 47, the air connection between the pressurized air from the air inlet P inside the valve 10 and the air outlet A via the outlet channels 46 is closed. When the stack 36 is lifted from its resting position, see FIG. 6, air can flow through the valve 10 from the air inlet P via the seat opening 47 via the outlet channels 46 to the air outlet A.

In order, to increase the air flow the seat opening 47 can be slit shaped having an elongated shape. Typically, the seat opening 47 can be elongated in the same direction as the plates in the stack 36. By having the seat opening 47 slit shaped, a high air flow can be achieved with a relative low lift height of the stack 36 compared to if a circular seat opening is used. Further, a wider section 49 can be formed at the mid-section of the slit shaped seat opening 47. Hereby air starts to flow quickly in the valve 10 when the excitation current is applied. This helps when lifting the stack in that the pressures are quickly equalized. The result is that the time from no airflow in the vale to full air flow in the valve can be reduced.

Figure 9:
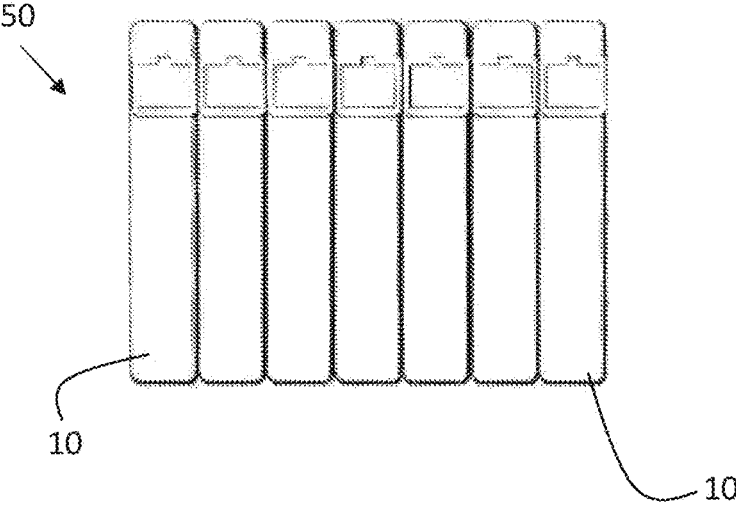
FIG. 9 illustrates stacked electromechanical valves.

A sorting device can be obtained by using the valve as set out above. In many applications it is desired to stack many valves close together. The valve 10 as described herein is particularly well suited for such applications. FIG. 9 shows a plurality of valves 10 stacked together to form a manifold 50 for sorting items such as grains. The sorting device formed by the manifold 50 can also be used to sort other items by means of air blasts.

Figure 10:
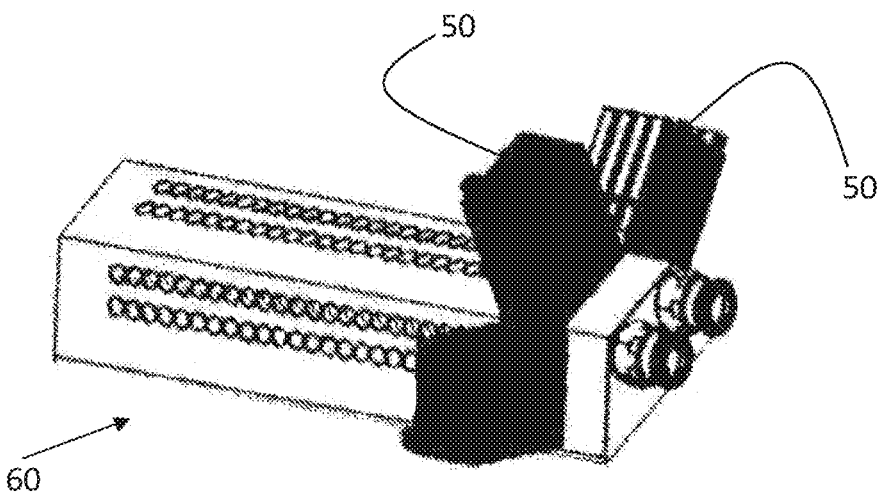
FIG. 10 illustrates a plurality of stacked valves in an off-set configuration.

The manifolds 50 combined to form a manifold arrangement 60 with a plurality of stacked valves arranged in parallel. By having a small offset between the parallel stacks valves the incremental distance between successive valves can be reduced. For example, if the valves are 6 mm thick and three parallel lines of stacked valves 10 are arranged with an offset pitch of 2 mm. The distance between 2 valves in such an arrangement will be only 2 mm. FIG. 10 illustrates such a manifold arrangement 60. Thus, an increased number of air passages over a distance can be achieved with multiple rows of offset valves. 3 rows of 6 mm valves can achieve 2 mm resolution of air openings, 6 rows achieve 1 mm etc.

Figures 11A, 11B, 11C:
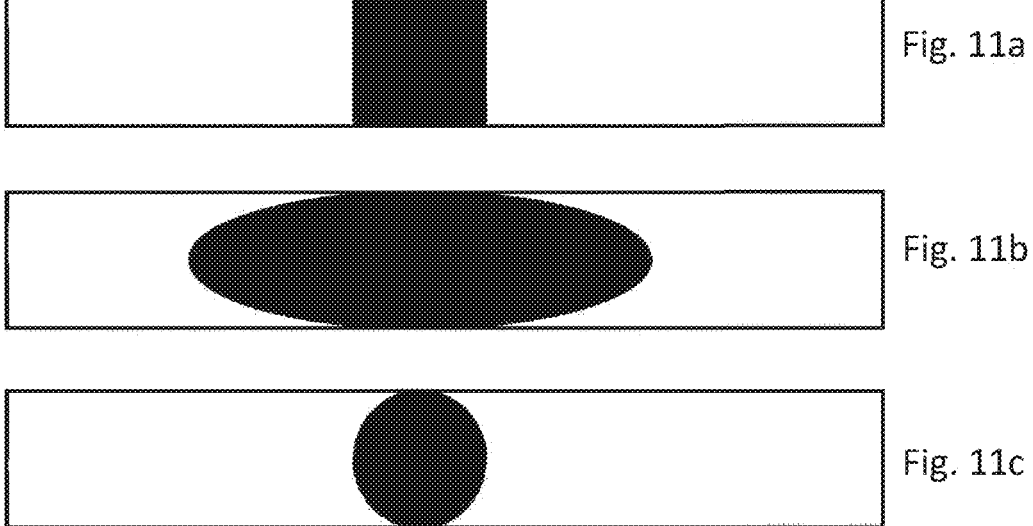
FIGS. 11a-11c illustrate different patterns.

Using the valve as described herein enables stacking of valves with a narrow pitch. In addition, the design enables a relative high air flow in relation to the small size of the valve. In other words, the flow capacity in relation to the size of the valve can be made higher than for other types of valves. The life time of the valve is long and the valve can endure many cycles without losing its good properties. Further, the response time is also low in comparison to other types of valves. This enables higher frequency in for example sorting applications whereby the sorting can be made faster. The fast response time and the high air-flow capacity is useful in other applications too. In air-blow applications, spray applications, and dispensing applications, an improved effect and precision can be obtained with a fast activation time as pressure will build up gradually during the opening of the valve. This is very important in sorting with air bursts and in precision spray like ink jet and similar applications. In FIG. 11 different ink patterns formed by air-bursts are illustrated. FIG. 11*a* illustrates the desired "perfect" ink dot. In FIG. 11*b* an ink dot formed when the pressure build up slowly is shown. Finally, FIG. 11*c* illustrates the result with a faster valve.

The invention claimed is:

1. An electromechanical valve, comprising in a housing, a valve mechanism comprising
    a core of magnetizable material surrounded by a coil to be supplied with excitation current,
    a stack of plates of magnetizable material secured in a first end thereof
    a valve seat, wherein the stack of plates is provided in a space between the core and the valve seat to open/close the valve in response to an excitation current supplied to said coil by displacing the stack of plates from the valve seat when excitation current is supplied to said coil, the stack of plates providing a return spring force when the stack of plates is attracted to by an energized coil, wherein the core is plate shaped having a thickness of less than 3 mm.

2. The electromechanical valve according to claim 1, wherein the core has an attraction section facing the stack of plates with no coil wound around the attraction section.

3. The electromechanical valve according to claim 2, wherein the attraction section forms a projection from the core.

4. The electromechanical valve according to claim 3, wherein the projection is a lip off-set from the plane of the core.

5. The electromechanical valve according to claim 1, wherein the core is less than 1 mm thick.

6. The electromechanical valve according to claim 1, wherein the valve seat has a slit shaped seat opening.

7. The electromechanical valve according to claim 6, wherein the slit shaped seat opening has a wider mid-section.

8. The electromechanical valve according to claim 1, wherein a plurality of outlets is provided in the housing and wherein at least two valve assemblies are provided where each of said at least two valve assemblies are associated with a respective outlet.

9. The electromechanical valve according to claim 1, wherein the core is U-shaped with two legs.

10. The electromechanical valve according to claim 9, wherein the coil is only wound around one of the legs of the U-shaped core or a section of one of the legs of the U-shaped core.

11. The electromechanical valve according to claim 1, wherein the core has a cross section where the width is at least 5 times the thickness of the core.

12. A sorting manifold comprising a plurality of stacked valves according to claim 1.

* * * * *